(12) United States Patent
Spiess et al.

(10) Patent No.: US 9,805,072 B2
(45) Date of Patent: Oct. 31, 2017

(54) QUALIFICATION OF MATCH RESULTS

(71) Applicants: Mark Spiess, La Crosse, WI (US);
Jeffrey Woody, Onalaska, WI (US);
Ronald Dupey, West Salem, WI (US)

(72) Inventors: Mark Spiess, La Crosse, WI (US);
Jeffrey Woody, Onalaska, WI (US);
Ronald Dupey, West Salem, WI (US)

(73) Assignee: SAP SE, Walldorf (DE)

(*) Notice: Subject to any disclaimer, the term of this patent is extended or adjusted under 35 U.S.C. 154(b) by 119 days.

(21) Appl. No.: 14/222,445

(22) Filed: Mar. 21, 2014

(65) Prior Publication Data

US 2015/0269219 A1 Sep. 24, 2015

(51) Int. Cl.
*G06F 17/30* (2006.01)

(52) U.S. Cl.
CPC .............................. *G06F 17/30303* (2013.01)

(58) Field of Classification Search
USPC ................................................. 707/706, 758
See application file for complete search history.

(56) References Cited

U.S. PATENT DOCUMENTS

| | | | | |
|---|---|---|---|---|
| 7,234,064 B2* | 6/2007 | Menschik | ............ | G06F 19/321 705/3 |
| 8,032,546 B2* | 10/2011 | Arasu | ............... | G06F 17/30569 707/769 |
| 8,417,651 B2* | 4/2013 | Kannan | ............ | G06F 17/30997 706/12 |
| 9,081,817 B2* | 7/2015 | Arasu | ............... | G06F 17/30507 |
| 9,613,042 B1* | 4/2017 | Joseph | ............. | G06F 17/30115 |
| 9,626,412 B2* | 4/2017 | Bayliss | ............... | G06F 17/3053 |
| 9,667,609 B2* | 5/2017 | McLaughlin | ........... | H04L 63/08 |
| 9,671,761 B2* | 6/2017 | Dougan | ................... | G04G 7/00 |
| 2011/0154254 A1* | 6/2011 | Singh | ..................... | G06Q 30/02 715/810 |
| 2014/0330845 A1* | 11/2014 | Feldschuh | ......... | G06F 17/30303 707/749 |

* cited by examiner

*Primary Examiner* — Kim Nguyen
(74) *Attorney, Agent, or Firm* — Mintz Levin Cohn Ferris Glovsky and Popeo, P.C.

(57) ABSTRACT

Qualification of data matches can be improved relative to existing approaches by use of first, second, and third similarity criteria, which can be used to identify a set of near match record pairs, identify a set of actual match record pairs and to flag as near matches those record pairs of the set of near matches that were identified as actual matches, and to identify and flag one or more suspect matches.

20 Claims, 4 Drawing Sheets

FIG. 1A

| Group ID | Person | Address | City | Region | Postcode | Phone |
|---|---|---|---|---|---|---|
| | Johnathon Davenport | | | | | (608) 489-2319 |
| | John Davenport | 6533 58th Ave NE | Seattle | WA | 98115-7836 | (608) 489-3219 |

| Group ID | Person | Address | City | Region | Postcode |
|---|---|---|---|---|---|
| 6. | Richard Biederwolf | 444 Highland Dr | Kohler | WI | 53044-1515 |
| | Rick Biederwolf | 444 Highland Dr | Kohler | WI | 53044-1515 |
| 7. | Dennis Foust | 1050 Avenue of The Americas | New York | NY | 10018-3742 |
| | E. Dennis Foust | 1050 6th Ave | New York | NY | 10018-3742 |
| 8. | L. Richard Cole | 700 Water St | Jacksonville | FL | 32204-1614 |
| | Dick Cole | 700 Water St | Jacksonville | FL | 32204-1614 |
| 9. | Liz Crutcher | 4835 Trumpet Cir | Nashville | TN | 37218-1625 |
| | Beth Crutcher | 4835 Trumpet Cir | Nashville | TN | 37218-1625 |

QUALIFICATION OF MATCH RESULTS

TECHNICAL FIELD

The subject matter described herein relates to qualifying of match results, for example for records in one or more databases.

BACKGROUND

Database management processes can include one or more aspects that require identification of matching records. As an example, a de-duplication process can include determining whether two or more records are at least partially duplicative. Records determined to refer to a same entity (e.g. a same person, a same instance of a business process, a same invoice, etc.) can be combined if none of the duplicate records include all information that should be retained in a single record representation of the entity. Alternatively, if combining of the records is not necessary, for example because at least one of the records includes all information that should be retained in a single record representation of the entity, one or more of the matching records can be deleted. De-duplication can be useful when partially overlapping data sets are merged or otherwise combined.

SUMMARY

Consistent with one or more aspects of the current subject matter, a set of near match record pairs can be identified by applying first similarity criteria to a set of record pairs. A set of actual match record pairs can be identified, and those record pairs of the set of near matches that were not identified as actual matches can be flagged as near matches by applying second similarity criteria to the set of near match record pairs. One or more suspect matches can be identified and flagged by applying third similarity criteria to the set of actual match record pairs.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an database management system, an enterprise resource management system, or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

In general, qualification of match results can include identification of two types of match results: near matches and suspect matches. Using previously available approaches, a user might query a set of suspect matches that are identified as suspect due to a low match similarity. However, this approach can fail to account for matches that are deemed to be suspect due to special data nuances. Additionally, the requirement to manually sort the data and observe the match groups to look for matching records that contain the questionable nuances can be a significant disadvantage.

As used herein, a near match includes two or more records that do not meet one or more minimum similarity threshold criteria requirements in order to be determined to be duplicates, but that nonetheless "close" to being duplicates. Records can be close non-matches as the result of a direct similarity comparison being very close to the minimum similarity threshold, or as the result of special data nuances that are common to certain data elements.

Several examples of near matches are described here for illustration purposes only. In a first example, a minimum threshold of similarity required for a person's first name can be 80%. When comparing the names "John Smith" and "Johm Smith" these records are determined to be non-matches because the first names are 75% similar, less than the minimum. However, assuming that a minimum similarity threshold for a near match first name is 74%, these names would be considered to be near matches. In this case, a direct string comparison algorithm can be used to flag "John" and "Johm" as near matches.

In another example, a minimum threshold of similarity for phone numbers can be 100%, after excluding noise data such as spaces and delimiters. According to this criterion, phone numbers such as 866-325-8165 and 866-325-8156 are determined to be non-matches. However, these phone numbers can be considered to be near matches because the only difference is that two of the numbers are transposed. The algorithm used in this example to flag near matches can include a special adjustment option for transposed characters.

In another example, a minimum threshold of similarity for email addresses can be 100%. According to this criterion, emails such as tom.schmidt@domain.com and tschmidt@domain.com are determined to be non-matches. However, these emails can be considered to be near matches because they have the same domain name, and the user names may be acceptable variations of each other. The algorithm used in this example to flag near matches can include a special adjustment option for abbreviated strings.

In another example, a minimum threshold of similarity for firms to match can be a 100% match, including any numeric portion (e.g. a branch or plant number). According to this criterion, firms such as First National Bank Branch 200 and First National Bank Branch 600 are determined to be non-matches. However, the firms can be considered to be near matches because they have the same firm name with the only difference being the numeric component. The algorithm used in this example is to flag near matches can include a special adjustment option for numeric words.

In another example, a minimum threshold of similarity for Japanese last names can include the requirement that they be written in the same writing script. According to this criterion, when last names are written in a transliterated script for the purpose of indicating how to pronounce the name, the last name transliterated to Latin script would therefore not match the same last name transliterated to Japanese hiragana script, and the two entries would be identified as a non-match. However, these transliterated last names can be considered to be near matches because they are versions of the same last name but in different scripts. The algorithm used in this example to flag near matches can include a special adjustment option for inter-script matching.

Figure 1A:
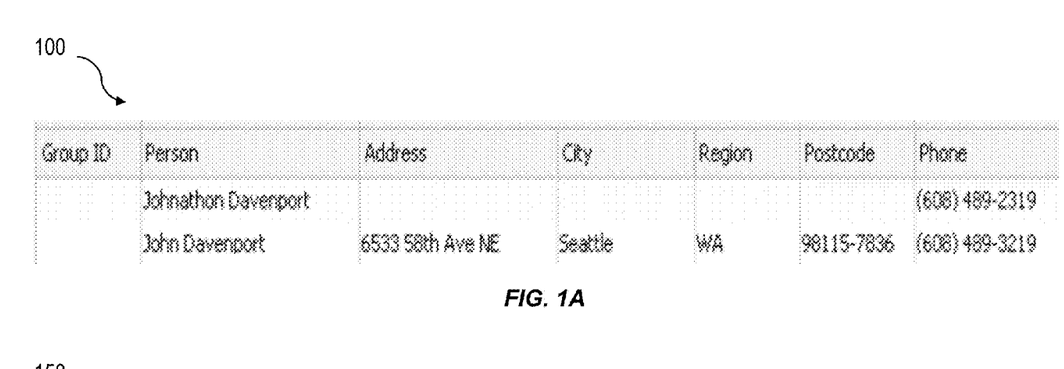
FIG. 1A and FIG. 1B show tables illustrating examples of near matches and suspect matches, respectively.

FIG. 1A shows a table 100 illustrating an example of a pair or near matches. Although the two records do not match based on the criteria defined in the match rules, it may be a advisable for these records to be manually review because the names are very similar and the only difference in the phone numbers is a transposition of two digits.

Suspect matches are records that meet the minimum similarity threshold criteria requirements and are therefore determined to be duplicates. However, the comparison process may encounter some feature about the match that makes it suspect. Match groups can be suspect as the result of barely meeting the minimum similarity threshold, or as the result of special data nuances that are acceptable as a probable match but should probably be manually reviewed (e.g. by a user) before determining them to be true duplicates. While near matches are non-matches that are very close to being matches, suspect matches are matches that are very close to being non-matches.

Several examples of suspect matches are described here for illustration purposes only. In one example, a record containing a first name can be identified as matching with a record containing only a matching initial, for example such that "John Smith" and "J. Smith" can be identified as potential matches. Records that are identified to match based on this type of criteria can be flagged as suspect matches. The algorithm used in this example to flag suspect matches can include a special adjustment option to use first name initialism for matching purposes, which can be disabled for flagging of matches as suspect.

In another example, a record containing a name with a postname (e.g. Jr., Sr., III, etc.) can be identified as matching with a record containing the same name without a postname. For example, a record containing "John Smith Sr." can be identified as a potential match with "John Smith." The algorithm used in this example to flag suspect matches can include an option for blank matching for matching purposes, which can be disabled for flagging of matches as suspect.

In another example, a record containing a street address with a street type can be identified as matching a same address with a different street type. For example, a record containing "100 Main St" can be identified as a potential match with "100 Main Ave" optionally if some other data component such as person name or firm name also matches between the records. The algorithm used in this example to flag suspect matches can include disregarding the street type for matching purposes, but considering it for flagging.

In another example, a record containing an address with a single unit can be identified as matching a same address with a compound unit. For example, a record containing "100 Main St Apt 300" can be identified as a potential match with "100 Main St Apt 300-C" again optionally if some other data component such as person name or firm name also matches between the records. The algorithm used in this example to flag suspect matches can include a special adjustment option for partial strings for matching purposes, which can be disabled for flagging of matches as suspect.

Figure 1B:
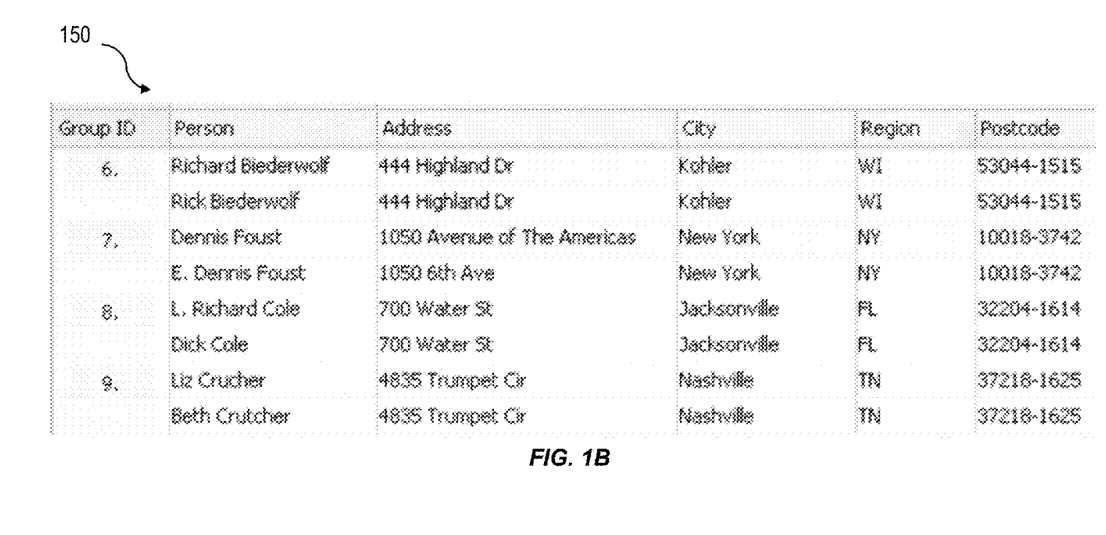

FIG. 1B shows a table 150 illustrating examples of suspect match groups. Groups 6 and 9 contain suspect criteria because they match due to name variations, and groups 7 and 8 contain suspect criteria because the first name in one record matches the middle name of the other record. Before automatically assuming that they are duplicates, it may be desirable for these records to be manually reviewed.

Previously available approaches to analyzing matched records, for example for identifying records incorrectly designated as matching when a non-match should have been indicated or records incorrectly designated as non-matching records that should match, have generally required review of a large number (typically thousands or even millions) of records and sorting in various ways to identify patterns of unexpected results. Using such approaches, after a pattern of unexpected results is identified and one or more adjustments to the match-finding algorithm are made, the analysis is repeated and reviewed again. Such approaches have generally lacked a satisfactory way to reduce the number of records to analyze or to quantify or otherwise readily visualize differences between results of an initial analysis and one or more of the repeated analyses. It is not uncommon for this fine-tuning process to take months.

To address the above-noted and potentially other deficiencies associated with previously available approaches, implementations of the current subject matter can permit filtering of records so that only those records requiring manual review or other human action are displayed in isolation. In this manner, patterns of unexpected results can be identified very quickly, thereby resulting in improvements in one or more of accuracy of results (e.g., seeing only records close to the threshold can make undesired results more readily apparent), business efficiency (e.g., a several-month fine tuning project can be reduced to days), and user experience (e.g., with an application using advanced intelligence, a user can more readily obtain desired results without requiring knowledge of match technology).

Instead of treating all non-matching records the same and all matching records the same, approaches consistent with the current subject matter can include flagging as near matches those non-matching records that are close to being matches and as suspect matches those matching records that are close to being non-matches. For example, in some implementations, match policies can be configured to include two stages of analysis based on first and second criteria. The first similarity criteria can be used to identify near matches, and can include more lenient similarity criteria (than the second similarity criteria) for specific data components. The second similarity criteria can be used to identify real or actual matches (referred to herein as "actual matches"), and can optionally include one or more existing approaches useful for determining matching criteria. A larger number of potential matches, or at most a same number of potential matches, will generally be identified based on the first similarity criteria than the second similarity criteria because of the increased leniency of the first similarity criteria relative to the second similarity criteria. In one example, the first similarity criteria can be applied in an initial screening process, and any identified potential near matches can then be processed using the second similarity criteria to identify actual matches. Record pairs are flagged as near matches when they match at the near-match level but do not match at the actual match level.

When records match at the actual match level, a group of matching records can be further compared using third similarity criteria, which are stricter (e.g. less lenient) than the second similarity criteria. A group of matching records can be flagged as suspect when the records match at the actual match level (e.g. based on the second similarity criteria) but do not match with the third similarity criteria. When a group of matching records contains at least one record pair that meets this condition, the whole group of matching records can be flagged as a suspect match group.

An analytical approach consistent with that described above can result in a matching solution that identifies groups of matching records with best practice configurations. In addition, some non-matching records (e.g. those records meeting the first criteria but not the second criteria) can be further flagged as being close to being matches, and some suspect records (e.g. those records meeting the second criteria but not the third criteria) can be further flagged as being close to being non-matches.

A user can control the similarity differences and exactly what special allowances of data nuances are allowed for the determination of both near matches and suspect matches. For example, one user may want the match pair "John Smith" and "J. Smith" to be flagged as a suspect group, and another user may not. Therefore, the rules can be configurable.

Qualification of match results can advantageously be used in improving accuracy of match results, for example by assisting a user in determining whether the matching criteria require adjustment or other tuning. No set of best practice configurations is likely to be optimal for all data sources in all organizations. It is generally likely that, for a particular project, the matching criteria would need to be either tightened or loosened to accomplish the best possible matching results.

Reviewing identified near matches can assist in identifying whether the matching criteria needs to be loosened. When a review of near matches reveals that they truly should not have been identified as actual match, then the matching criteria do not require loosening. However, when a review reveals that many of the near matches really should match, then the matching criteria should advantageously be loosened.

In a similar but converse manner, reviewing identifies suspect matches can assist in determining whether the criteria for identifying actual matches (e.g. the second criteria) needs to be tightened. When a review of the suspect matches reveals that they truly should match, then the matching criteria does not have to be tightened. But when a review reveals that many of the suspect matches really should not match, then the matching criteria should advantageously be tightened.

Previously available approaches generally lacked a desirable approach to querying for near matches. Typically, the whole data set (sometimes numbering millions of records) would be sorted in various ways and the data manually inspected to search for record pairs that were non-matches but close to being matches. Using implementations of the current subject matter, record pairs are specifically flagged as near matches such that a data consistency application (such as, for example, Data Cleansing Advisor available from SAP AG of Walldorf, Germany) can filter on those records and display them together for a user to see them in isolation. When a user sees the near matches in isolation, it becomes apparent whether or not the matching criteria should be loosened.

Similarly, previously available approaches could generally users to query suspect matches that were suspect due to a low match similarity, while generally lacking a desirable approach to querying for suspect matches those that were suspect due to special data nuances. Again, the user would generally be required to sort the data and observe the record pair looking for matching records that contain the questionable nuances. Using implementations of the current subject matter, record pairs are specifically flagged as suspect matches such that a data consistency application can filter on those records and display them together for the user to see them in isolation. An observation of these suspect matches can make it readily apparent whether or not the matching criteria should be tightened.

Figure 2:
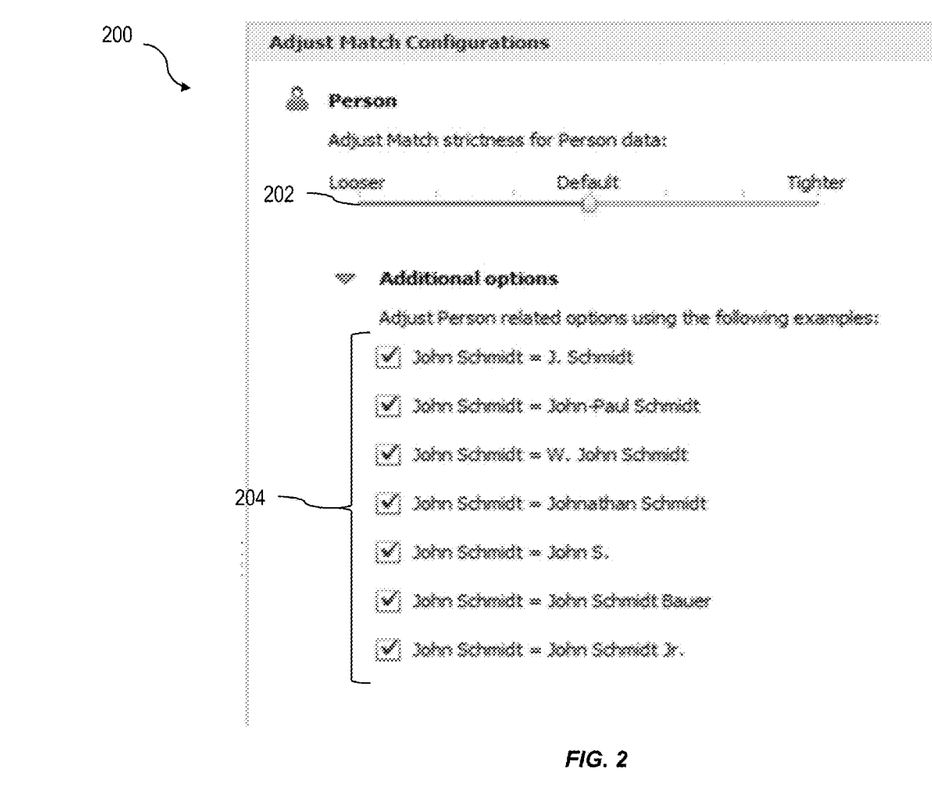
FIG. 2 shows a screenshot view illustrating features constituent with implementations of the current subject matter.

By analyzing the near matches and suspect matches in isolation, a user wishing to perform fine-tuning of the matching criteria can optionally do so using a user interface including one or more screen views that allow adjustments to any one or more of the first, second, and third criteria to be made directly. FIG. 2 shows a screenshot 200 illustrating features of a user interface consistent with this implementation of the current subject matter. As shown in FIG. 2, a slider control 202 is an example of a user interface element that can be used to receive user input for altering a similarity requirement for a data component (in the example, person data such a name) and special data nuances 204 for matching person name data. The illustrated example is for second similarity criteria (e.g. for determining an actual match). Similar approaches can be used to allow a user to modify first similarity criteria and third similarity criteria as well. Additionally, a similar approach can be used for receiving user input for matching other data components, such as for example organization name, address, phone number, etc.

In other variations, a user interface can include an auto-generated suggestion feature that proposes changes to one or more of the first, second, and third criteria. The user interface can also include the ability to illustrate the impact that any change would make to the data. The result is that the number of near matches or the number of suspect matches can be reduced as desired by the user. Using previously available approaches, making a change to the match rules would generally be performed without ready access to statistics or other metrics indicating how the change to the match rules impacts the results. Use of near matches and suspect matches counts produced using implementations of the current subject matter can allow a data consistency application to generate and display statistics or other metrics indicative of impact of a single change, which can advantageously provide a user with information needed to make an informed decision on whether the change was the right thing to do. The fine-tuning process thereby can become much more precise and accurate.

Qualification of match results can also be advantageous for improving business efficiencies. Using previously available approached, all non-matching records were typically treated equally, and all groups of matching records were treated equally. In contrast, using a data consistency application having the abilities described herein to automatically flag and filter non-matching records that are close to being matches and matching records that are suspect, users can make decisions on fine-tuning the matching criteria with just a few clicks and a very little time in observation of these two types of records.

Another efficiency benefit that can result from the flagging of suspect matches is that the high-confidence match groups (those not flagged as suspect) do not need any manual intervention. Accordingly, such match groups can generally be routed automatically to have post-match processes applied. Such post match processes can include, but are not limited to consolidation of data, formation of a best record, disregarding duplicate records, or the like. The low-confidence match groups (e.g. those flagged as suspect) can be routed to a review process in which they are reviewed manually, for example so that a user can research any necessary issues, etc. before determining whether the records match or not.

Figure 3:
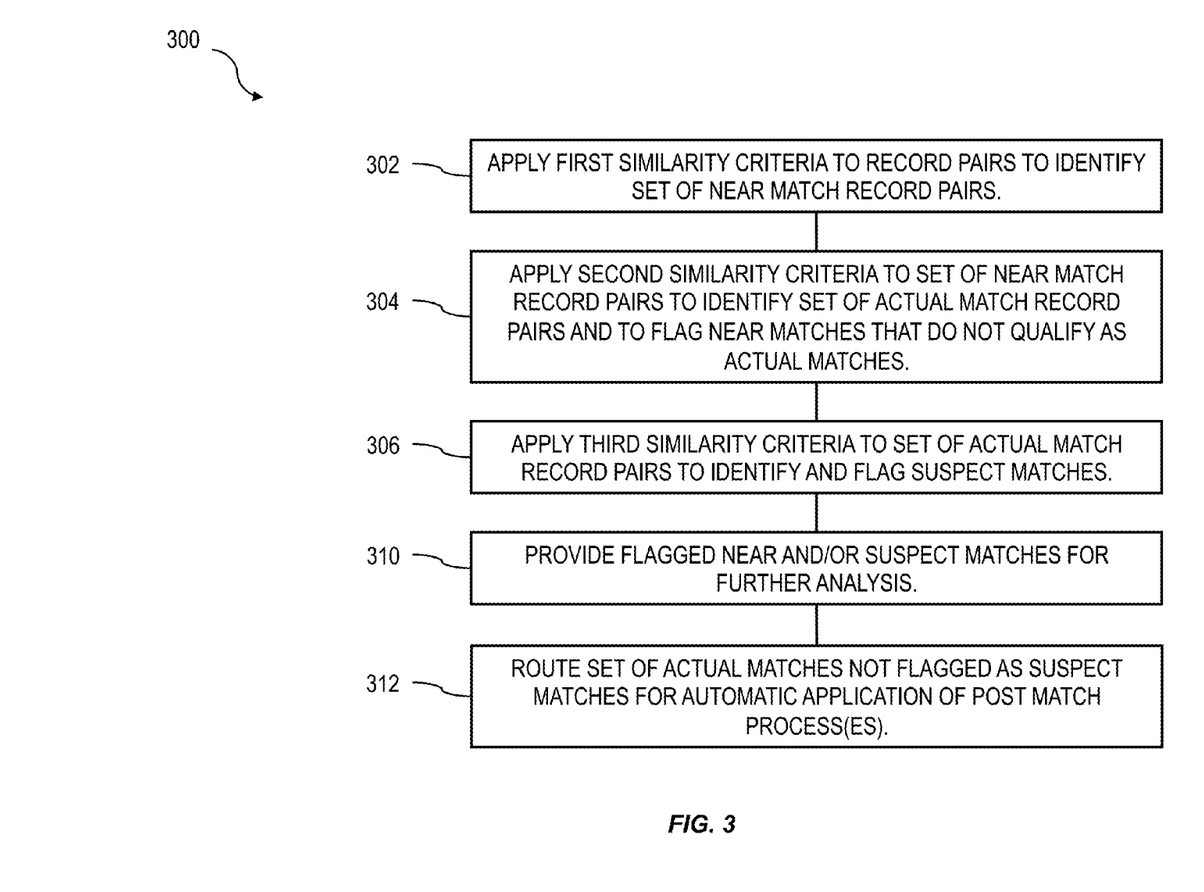
FIG. 3 shows a process flow diagram illustrating aspects of a method having one or more features consistent with implementations of the current subject matter.

FIG. 3 shows a process flow chart 300 illustrating features of a method consistent with implementations of the current subject matter. At 302, first similarity criteria are applied to record pairs that include first record and second records. The applying of the first similarity criteria a given record pair includes comparing a first value in a field of the first record with a second value in a corresponding field of the second record to determine whether the record pair qualifies as a near match. At 304, second similarity criteria are applied to record pairs identified as near matches to determine whether the record pair qualifies as an actual match. Near matches not qualifying as actual matches can be flagged as near matches. Actual matches are further reviewed at 306 by applying third similarity criteria to record pairs identified as actual matches to flag actual matches that should be classified as suspect matches. At 310, the flagged near matches and/or suspect matches are provided for further analysis, which can include displaying the near matches and/or suspect matches to a user via a user interface, printout, or other display approach. Alternatively or in addition, the actual matches (e.g. those not flagged as either of near or suspect matches) can be routed automatically to have post-match processes applied.

Figure 4:
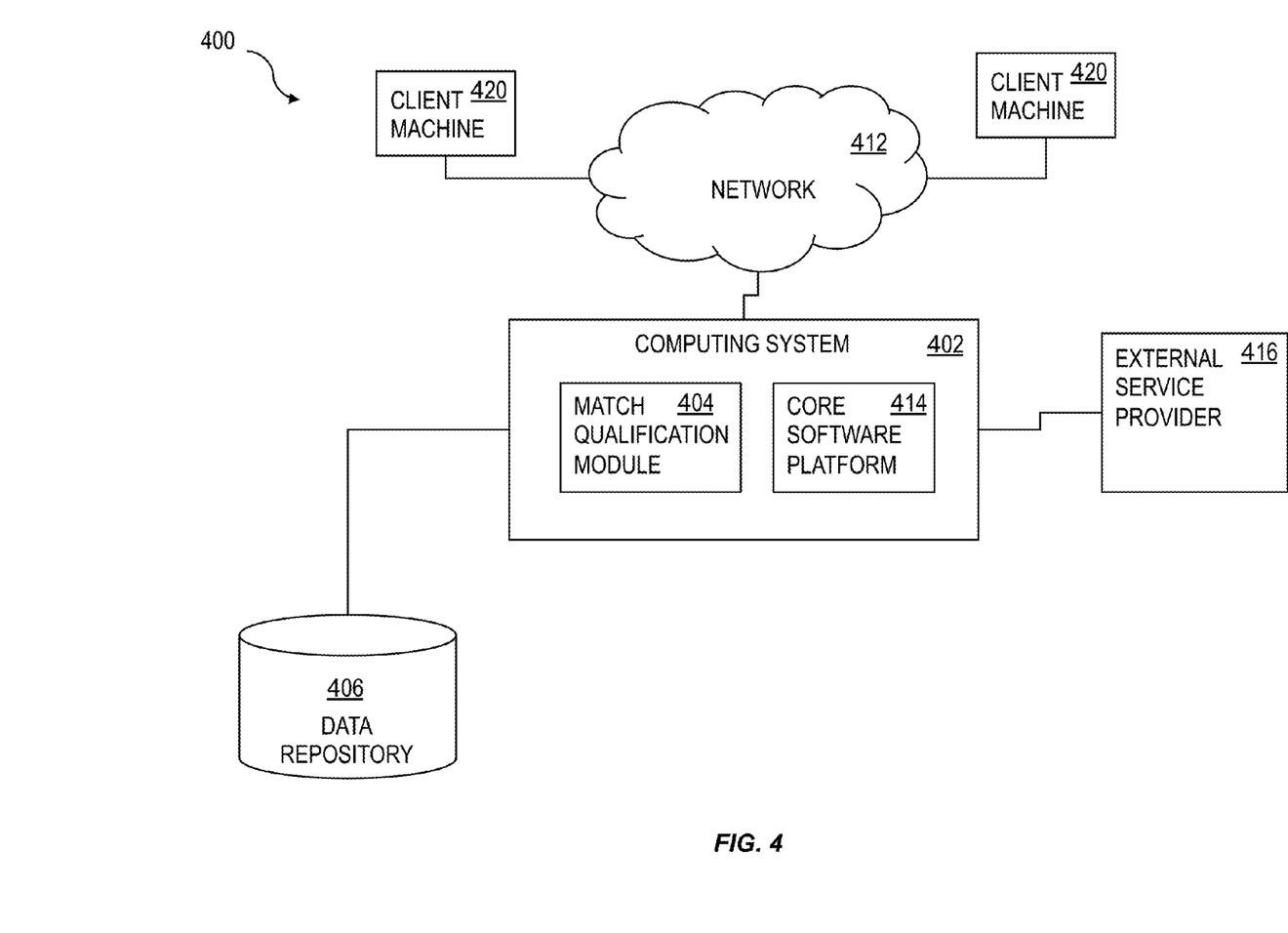
FIG. 4 is a diagram illustrating aspects of a system showing features consistent with implementations of the current subject matter.

In an implementation of the current subject matter illustrated in the architecture diagram 400 shown in FIG. 4, a computing system 402 can perform operations consistent with one or more features of a database management system, enterprise resource planning system, or the like. A match qualification module 404 can be implemented in the computing system 402 or in another computing system that can access one or more data repositories 410 that store data. The one or more data repositories 410 can be stored on computer readable storage media that are a part of the computing system 402, or alternatively or in addition, on one or more computer readable storage media that can be accessed by the computing system 402 over one or more data connections, which can include a data bus, a local network connection, a wide area connection, or some other connection accessible via a network 412.

The computing system 402 can optionally include one or more physical programmable processors. In another implementation, the computing system 402 can optionally include two or more separate machines that communicate over a bus, a network connection, a direct local connection, or the like. Each of the two or more machines can optionally include one or more physical programmable processors. The match qualification module 404 or one or more routines, procedures, or other software functionality can provide one or more similar functionalities or features to those discussed herein. In some implementations, the computing system 402 can also include one or more core software platform modules 414 providing one or more features of a business software system, such as for example an enterprise resource planning (ERP) application or database management system. The computing system 402 can also aggregate or otherwise provide a gateway via which users can access functionality provided by one or more external service providers 416. Client machines 420 can access the computing system 402, either via a direct connection, a local terminal, or over a network 412 (e.g. a local area network, a wide area network, a wireless network, the Internet, or the like).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible.

Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
    applying first similarity criteria to a set of record pairs to identify a set of near match record pairs, the applying comprising:
    identifying a pair of records in the set of record pairs as a near match record pair when:
        a similarity between the pair of records exceeds a minimum similarity threshold and when the pair of records is a name,
        the pair of records contains an email address comprising a domain name that is the same in the pair of records,
        the only difference between the pair of records is a numeric component,
        the pair of records match when the pair of records is translated to a same script, and
        adding, the near match record pair to the set of near match record pairs;
    applying, after identifying the set of near match record pairs, second similarity criteria to the set of near match record pairs to identify a set of actual match record pairs, the second similarity criteria being more strict than the first similarity criteria;
    flagging, as near matches, those record pairs of the set of near matches that were not identified as actual matches;
    applying, after identifying the set of actual match record pairs, third similarity criteria to the set of actual match record pairs to identify and flag one or more suspect matches, the third similarity criteria being more strict than the second similarity criteria;
    flagging, as a suspect match group, the set of actual match record pairs that contain the one or more suspect matches; and
    providing at least one of the flagged near matches, the flagged suspect matches, and the flagged suspect match group for further analysis.

2. A computer program product as in claim 1, wherein the operations further comprise routing the set of actual matches for automatic application of one or more post match processes.

3. A computer program product as in claim 2, wherein the one or more post match processes comprise at least one of consolidation of data, formation of a best record, and disregarding one or more duplicate records.

4. A computer program product as in claim 1, wherein the providing comprises presenting a user interface displaying at least some of the flagged near matches and/or the flagged suspect matches and supporting functionality that allows a user to perform fine-tuning of one or more of the first criteria, the second criteria, and the third criteria.

5. A computer program product as in claim 4, wherein the user interface further comprises an auto-generated suggestion feature that proposes changes to one or more of the first criteria, the second criteria, and the third criteria.

6. A computer program product as in claim 4, wherein the user interface further comprises functionality for illustrating an impact of a change to one or more of the first criteria, the second criteria, and the third criteria on classification of the record pairs.

7. A system comprising:
    computer hardware configured to provide operations comprising:

applying first similarity criteria to a set of record pairs to identify a set of near match record pairs, the applying comprising:
identifying a pair of records in the set of record pairs as a near match record pair when:
a similarity between the pair of records exceeds a minimum similarity threshold and when the pair of records is a name,
the pair of records contains an email address comprising a domain name that is the same in the pair of records,
the only difference between the pair of records is a numeric component,
the pair of records match when the pair of records is translated to a same script, and
adding, the near match record pair to the set of near match record pairs;
applying, after identifying the set of near match record pairs, second similarity criteria to the set of near match record pairs to identify a set of actual match record pairs, the second similarity criteria being more strict than the first similarity criteria;
flagging, as near matches, those record pairs of the set of near matches that were not identified as actual matches;
applying, after identifying the set of actual match record pairs, third similarity criteria to the set of actual match record pairs to identify and flag one or more suspect matches, the third similarity criteria being more strict than the second similarity criteria;
flagging, as a suspect match group, the set of actual match record pairs that contain the one or more suspect matches; and
providing at least one of the flagged near matches, the flagged suspect matches, and the flagged suspect match group for further analysis.

8. A system as in claim 7, wherein the operations further comprise routing the set of actual matches for automatic application of one or more post match processes.

9. A system as in claim 8, wherein the one or more post match processes comprise at least one of consolidation of data, formation of a best record, and disregarding one or more duplicate records.

10. A system as in claim 7, wherein the providing comprises presenting a user interface displaying at least some of the flagged near matches and/or the flagged suspect matches and supporting functionality that allows a user to perform fine-tuning of one or more of the first criteria, the second criteria, and the third criteria.

11. A system as in claim 10, wherein the user interface further comprises an auto-generated suggestion feature that proposes changes to one or more of the first criteria, the second criteria, and the third criteria.

12. A system as in claim 10, wherein the user interface further comprises functionality for illustrating an impact of a change to one or more of the first criteria, the second criteria, and the third criteria on classification of the record pairs.

13. A system as in claim 7, wherein the computing hardware comprises:
at least one programmable processor; and
a machine-readable medium storing instructions that, when executed by the at least one programmable processor, cause the at least one programmable processor to provide the operations.

14. A computer-implemented method comprising:
applying first similarity criteria to a set of record pairs to identify a set of near match record pairs, the applying comprising:
identifying a pair of records in the set of record pairs as a near match record pair when:
a similarity between the pair of records exceeds a minimum similarity threshold and when the pair of records is a name,
the pair of records contains an email address comprising a domain name that is the same in the pair of records,
the only difference between the pair of records is a numeric component,
the pair of records match when the pair of records is translated to a same script, and
adding, the near match record pair to the set of near match record pairs;
applying, after identifying the set of near match record pairs, second similarity criteria to the set of near match record pairs to identify a set of actual match record pairs, the second similarity criteria being more strict than the first similarity criteria;
flagging, as near matches, those record pairs of the set of near matches that were not identified as actual matches;
applying, after identifying the set of actual match record pairs, third similarity criteria to the set of actual match record pairs to identify and flag one or more suspect matches, the third similarity criteria being more strict than the second similarity criteria;
flagging, as a suspect match group, the set of actual match record pairs that contain the one or more suspect matches; and
providing at least one of the flagged near matches, the flagged suspect matches, and the flagged suspect match group for further analysis.

15. A computer-implemented method as in claim 14, further comprising routing the set of actual matches for automatic application of one or more post match processes.

16. A computer-implemented method as in claim 15, wherein the one or more post match processes comprise at least one of consolidation of data, formation of a best record, and disregarding one or more duplicate records.

17. A computer-implemented method as in claim 14, wherein the providing comprises presenting a user interface displaying at least some of the flagged near matches and/or the flagged suspect matches and supporting functionality that allows a user to perform fine-tuning of one or more of the first criteria, the second criteria, and the third criteria.

18. A computer-implemented method as in claim 17, wherein the user interface further comprises an auto-generated suggestion feature that proposes changes to one or more of the first criteria, the second criteria, and the third criteria.

19. A computer-implemented method as in claim 17, wherein the user interface further comprises functionality for illustrating an impact of a change to one or more of the first criteria, the second criteria, and the third criteria on classification of the record pairs.

20. A computer-implemented method as in claim 14, wherein the providing and the applying of the first criteria, the second criteria, and the third criteria are performed by at least one system comprising at least one programmable processor.

* * * * *